(No Model.) 2 Sheets—Sheet 2.
J. J. JOHNSTON.
POTATO DIGGER.
No. 266,830. Patented Oct. 31, 1882.
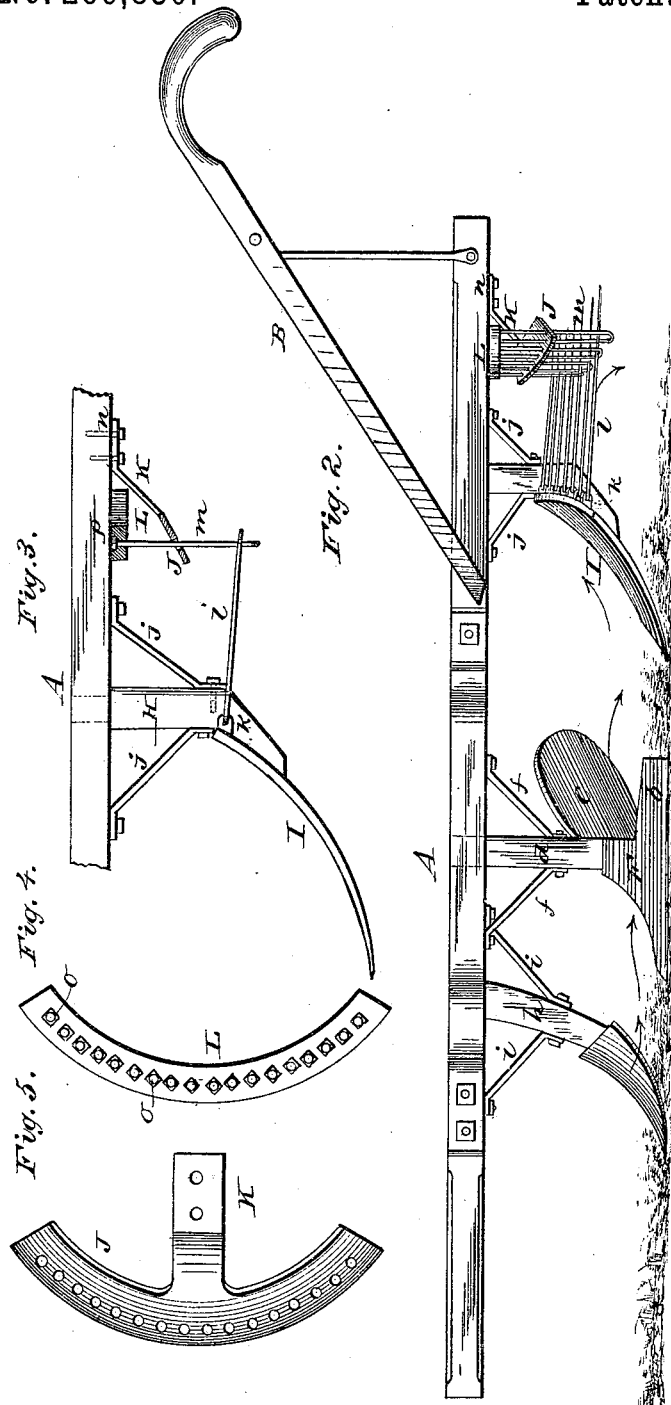
WITNESSES:
Fred G. Dieterich
P. C. Dietrich
INVENTOR.
James J. Johnston

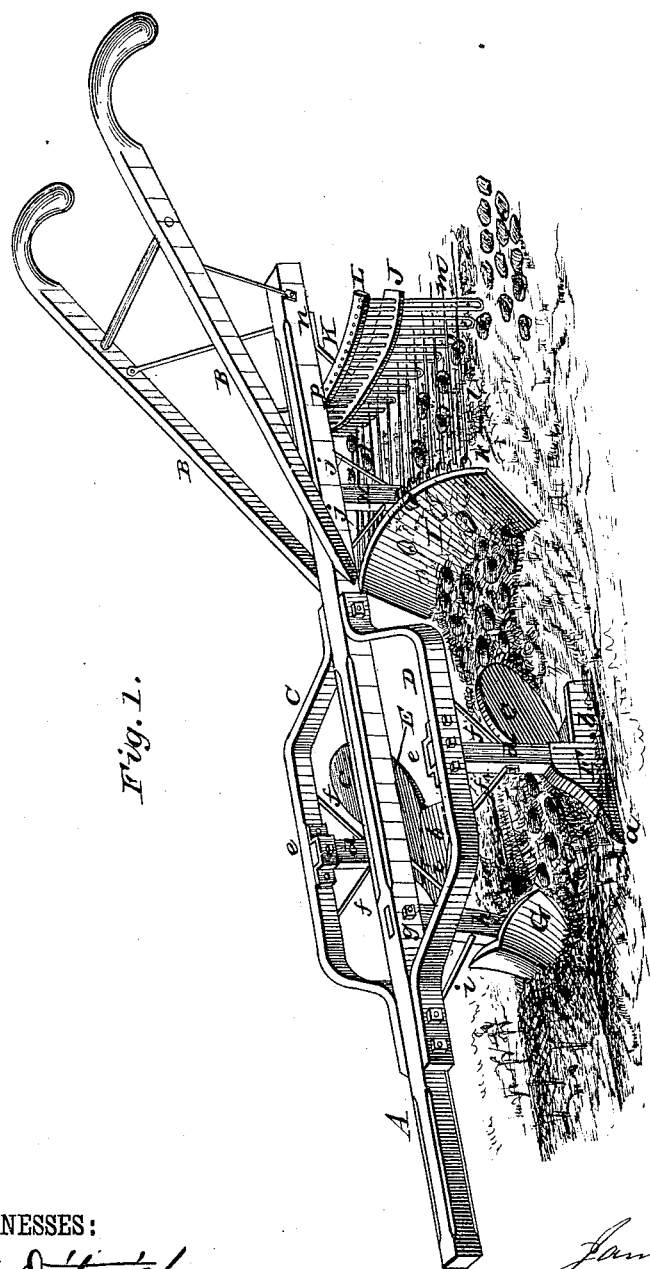

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

POTATO-DIGGER.

SPECIFICATION forming part of Letters Patent No. 266,830, dated October 31, 1882.

Application filed February 23, 1882. (No model.)

*To all whom it may concern:*

Be it known that I, JAMES J. JOHNSTON, of Columbiana, in the county of Columbiana and State of Ohio, have invented a certain new and useful Improvement in Potato-Diggers; and I do hereby declare that the following is a full, clear, and exact description thereof, reference being had to the accompanying drawings, and to the letters of reference marked thereon.

My invention relates to an improvement in potato-diggers; and it consists in the construction, arrangement, and combination of the several parts hereinafter described.

To enable others skilled in the art with which my invention is most nearly connected to make and use it, I will proceed to describe its construction and operation.

In the accompanying drawings, which form part of this specification, Figure 1 is a perspective view of my improvement in potato-digger and cultivator combined. Fig. 2 is a side elevation of the same. Figs. 3, 4, and 5 are detail views.

Reference being had to the accompanying drawings, A represents the beam, and B B the handles attached thereto and provided with the usual braces, which beam and handles are constructed of wood, and are similar in form and construction to that of the ordinary plow.

To the sides of the beam A are attached wrought-iron carriers C and D for small plows E and F, each having point $a$, landside $b$, and mold-board $c$, and a standard, $d$, which are attached to the carriers C D at $e$, and provided with braces $f$.

To the beam A at $g$ is attached the standard $h$ of the shovel-plow G, which standard $h$ is furnished with braces $i$.

To the beam A is attached a standard, H, having braces $j$, and to the standard H is attached a concaved scoop, I, the upper edge of which forms an arc, and on the rear side, near the top edge of the concaved scoop I, are a series of lugs, $k$, in which are pivoted iron rods $l$, the rear ends of which move vertically in guides $m$, which pass up through a brace, J, and form an arc. The form of said brace is clearly shown in Fig. 5, and is attached by its arm K to the beam A at $n$. The guides $m$ are attached at their upper ends to a piece, L, by means of screw-nuts $o$, fitted to screw-threads on the ends of said guides. The piece L also forms an arc, as shown in Fig. 4, and is attached to the beam A at $p$. The rods $l$ and the guides $m$, it will be observed, form arcs, one being horizontal and the other vertical, the purposes of which will hereinafter be explained.

The shovel-plow G, concave scoop I, brace J, and piece L, and the several parts connected therewith should be so constructed and arranged that they can be readily and with facility detached from the beam A, leaving the small plows E F, thereby forming an excellent straddle-row cultivator for the cultivation of corn and potatoes.

The foregoing description and reference to the accompanying drawings will readily enable the skillful mechanic to construct my improvement in potato digger and cultivator combined. I will therefore proceed to describe its operation in the digging of potatoes. Its operation as a cultivator will be understood, and therefore it will not be necessary to describe its operation as a cultivator.

In the digging of potatoes the shovel-plow G is entered at the end of the row of potato-hills, so as to pass under the hills, which will break up the earth of the hills, throwing the earth right and left toward the plows E and F, which, following after the shovel-plow G, will throw back the broken-up earth, and, further pulverizing it, will, by their mold-boards $c$, throw the earth up into a well-defined row midway between said mold-boards, and the concaved scoop I, following after the small plows E F, will cause the row of pulverized earth and the potatoes therein to pass up the face of the scoop I and over its upper edge on to the arc formed by the rods $l$, which, being constantly agitated by their rear ends traveling over the broken-up earth, will riddle the earth through said rods and separate the potatoes therefrom, which, coming against the arc formed by the guides $m$, will roll down over the rods on each side, forming two well-defined rows of potatoes, as indicated in Fig. 1, which can be easily gathered.

Having thus described my invention, what I claim as new, and desire to secure by Letters Patent, is—

In a potato-digger, the combination of beam A, having handles B B, shovel-plow G, small plows E F, each having point $a$, landside $b$, and mold-board $c$, concave scoop I, the top edge of which forms an arc, pivoted rods $l$, forming an arc, and guides $m$, attached to piece L and supported by brace J, said guides also forming an arc, all substantially as herein described, and for the purpose set forth.

JAMES J. JOHNSTON.

Witnesses:
 T. D. D. OURAND,
 FRED. G. DIETERICH.